United States Patent
Brinkley (10) Patent No.: US 11,312,287 B1
(45) Date of Patent: Apr. 26, 2022

(54) TRANSPORT DEVICE AND ASSEMBLY

(71) Applicant: Chad Brinkley, Thomasville, NC (US)

(72) Inventor: Chad Brinkley, Thomasville, NC (US)

(73) Assignee: BooneDOX, Inc., Thomasville, NC (US)

( * ) Notice: Subject to any disclaimer, the term of this patent is extended or adjusted under 35 U.S.C. 154(b) by 0 days.

(21) Appl. No.: 17/004,083

(22) Filed: Aug. 27, 2020

Related U.S. Application Data (60) Provisional application No. 62/892,051, filed on Aug. 27, 2019.

(51) Int. Cl.
*B60P 3/10* (2006.01)
*B63C 3/06* (2006.01)

(52) U.S. Cl.
CPC .............. *B60P 3/1066* (2013.01); *B63C 3/06* (2013.01)

(58) Field of Classification Search
CPC . B60R 9/06; B60R 9/00; B60P 3/1016; B60P 3/1008; B60P 3/1083; B60P 3/1075; B60P 3/1066
See application file for complete search history.

(56) References Cited

U.S. PATENT DOCUMENTS

| | | | | |
|---|---|---|---|---|
| 3,128,893 A | * | 4/1964 | Jones | B60P 3/1025 414/462 |
| 3,565,271 A | * | 2/1971 | Deck | B60P 3/1008 414/462 |
| 3,777,922 A | * | 12/1973 | Kirchmeyer | B60P 3/1016 414/462 |
| 5,752,636 A | * | 5/1998 | Manley | B60P 3/40 224/403 |
| 5,938,092 A | * | 8/1999 | Johnson | B60R 9/06 224/521 |
| 5,957,350 A | * | 9/1999 | Giles | B60R 9/042 224/310 |
| 6,237,824 B1 | * | 5/2001 | Bagley | B60R 9/06 224/402 |
| 2010/0316474 A1 | * | 12/2010 | Stiles | B60P 3/1075 414/462 |
| 2011/0024472 A1 | * | 2/2011 | Thompson | B60R 9/042 224/500 |
| 2013/0284781 A1 | * | 10/2013 | Brinkley | B60R 9/065 224/402 |
| 2018/0105119 A1 | * | 4/2018 | Spivia | B60R 9/08 |
| 2018/0345872 A1 | * | 12/2018 | Kraeuter | B60R 9/06 |

* cited by examiner

*Primary Examiner* — Kaitlin S Joerger
(74) *Attorney, Agent, or Firm* — MacCord Mason PLLC (57) ABSTRACT

A device and assembly for loading a watercraft. In one embodiment, the device includes an elongated extension brace and a lever pivotable about the elongated extension's second end. A tether may be aligned about the lever and repositionable between a vehicle and the watercraft. The result is an assembly to repositionably secure a watercraft from a surface to a loaded vehicle position.

18 Claims, 8 Drawing Sheets

TRANSPORT DEVICE AND ASSEMBLY

This application claims the benefit to U.S. provisional application No. 62/892,051, filed Aug. 27, 2019, which is herein incorporated by reference in its entirety.

BACKGROUND

Field

The present disclosure relates generally to watercrafts and, more particularly, to loading, transporting, and unloading a watercraft between a surface to a vehicle.

Therefore, Applicant desires a universal loading and unloading system, device, assembly, and method in connection with a watercraft without the drawbacks presented by the traditional systems and methods.

SUMMARY

In accordance with the present inventions, a universal watercraft loading and transporting assembly is provided for manipulating a watercraft. These inventions provide an improved device and assembly that is convenient, efficient and safe for the user, particularly when used in loading, operating, and transporting watercrafts.

In one embodiment, a device for loading and transporting a watercraft on a vehicle includes an elongated extension brace having a first end attachable to the vehicle and a substantially offset second end; and a load shifting lever having a roller and pivotable about a pivot point on the elongated extension's second end, and wherein the lever comprises a receiving slide face spaced between a pair of opposing runners adapted to align the watercraft, and wherein the lever adapted to pivot substantially one hundred and eighty degrees while engaged with the watercraft to a second loaded position.

In one embodiment, an assembly for loading and unloading a watercraft, includes a load shifting lever pivotable about an elongated extension protruding from a vehicle, wherein the lever adapted to align substantially parallel with the elongated extension and receive the watercraft in a first loading position, and wherein the lever adapted to pivot substantially one hundred and eighty degrees while supporting the watercraft to a second loaded position.

In one embodiment, an assembly for loading and transporting a watercraft on a vehicle having a trailer hitch includes an elongated extension brace having a first end attachable to the trailer hitch, an elbow, and a substantially offset second end; a lever pivotable about the elongated extension's second end and having a receiving slide face spaced between a pair of opposing runners; and a tether aligned about the lever and repositionable between the vehicle and the watercraft.

In some examples, a winch is supported on the vehicle. The lever may be aligned substantially parallel to the elongated extension brace in a loading position. The lever may be aligned at a substantially acute angle with a surface in a loading position. The assembly may deliver the watercraft onto a bed of the vehicle in a loaded position. The lever may be aligned substantially parallel with the bed in the loaded position. Further, the lever may pivot substantially one hundred and eighty degrees while engaged with the watercraft to a loaded position.

In particular examples, the load shifting lever may include a roller rotatably mounted about the lever. The roller may include a bow roller aligned along a proximate end of the lever. The roller may include a bow roller aligned along a distal end of the lever. The roller may include a pair or rollers aligned at separate locations along the lever.

In some examples, the elongated extension brace includes a plurality of adjustment apertures. The elongated extension brace may include an elbow offsetting the first end about the second end. The elongated extension brace may include a load bearing frame adapted to support at least one watercraft. The receiving slide face may include a poly slide surface adapted to reduce bow friction. The pair of opposing runners may define a cavity sized to receive a corresponding watercraft hull. The opposing runners may include elongated walls. Further, the opposing runners may include at least one wing.

In another embodiment, a device for loading and transporting a watercraft on a vehicle includes an elongated extension brace having a first end attachable to the vehicle and a substantially offset second end; and a load shifting lever pivotable about a pivot point on the elongated extension's second end, and wherein the lever comprises a receiving slide face spaced between a pair of opposing runners adapted to align the watercraft.

In some examples, the lever includes a roller rotatably mounted about the lever. The roller may include a bow roller aligned along a proximate end of the lever. The roller may include a bow roller aligned along a distal end of the lever. The roller may include a pair or rollers aligned at separate locations along the lever.

In particular examples, the lever may pivot substantially one hundred and eighty degrees while engaged with the watercraft to a second loaded position.

In some examples, the elongated extension brace includes a plurality of adjustment apertures. The elongated extension brace may include an elbow offsetting the first end about the second end. The elongated extension brace may include a load bearing frame adapted to support at least one watercraft. The first end of the elongated extension brace may include a fitting adapted to mate with a trailer hitch.

In particular examples, the receiving slide face includes a poly slide surface adapted to reduce bow friction. The pair of opposing runners may define a cavity sized to receive a corresponding watercraft hull. The opposing runners may include elongated walls. The elongated walls may be repositionable about fasteners to define a plurality of semi-fixed width cavities. The opposing runners may include at least one wing. The rear face may be pivotable to a substantially parallel position about the elongated extension brace.

In another embodiment, an assembly for loading and unloading a watercraft includes a load shifting lever pivotable about an elongated extension protruding from a vehicle, wherein the lever adapted to align substantially parallel with the elongated extension and receive the watercraft in a first loading position, and wherein the lever adapted to pivot substantially one hundred and eighty degrees while supporting the watercraft to a second loaded position.

In some examples, the rear face of the lever positioned is adjacent the elongated extension in the loading position. The lever may include a receiving slide face. The lever may include a pair of opposing runners. The lever includes a roller rotatably mounted about the lever. The roller may include a bow roller aligned along a proximate end of the lever. The roller may include a bow roller aligned along a distal end of the lever. The roller may include a pair or rollers aligned at separate locations along the lever.

In particular examples, the elongated extension includes an offset alignment. The elongated extension may include an elbow offsetting a first end about a second end. The first end of the elongated extension may include a fitting adapted to mate with a trailer hitch. Further, the elongated extension may include a load bearing frame adapted to support at least one watercraft.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which:

FIG. 2b is a top perspective view of the embodiment introduced in

FIG. 1;

DESCRIPTION OF EMBODIMENTS

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 1:
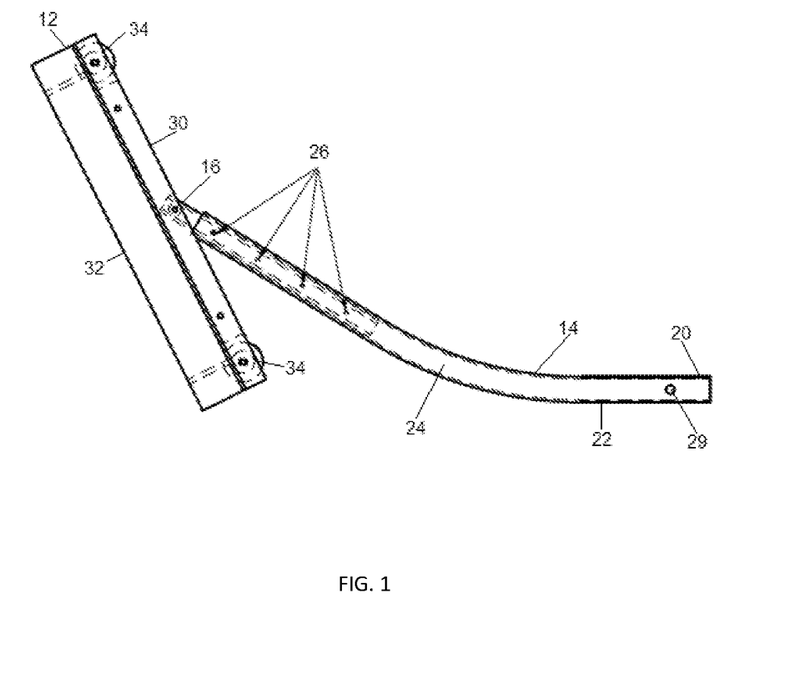
FIG. 1 is a side view of a load shifting assembly according to one embodiment of the disclosure.
Figure 1A:
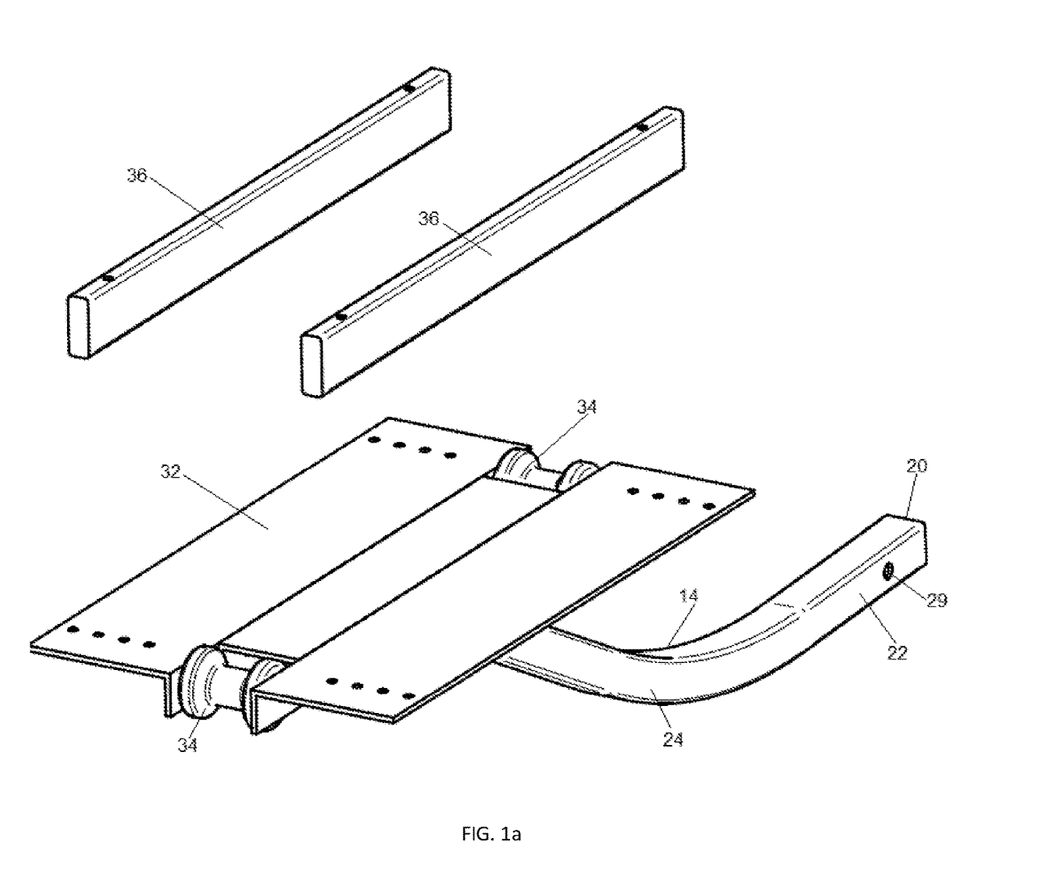
FIG. 1a is a partially exploded, bottom perspective view of the embodiment introduced in FIG. 1, with elements removed for clarity.

Referring now to the drawings in general and FIGS. 1 and 1a in particular, it will be understood that the illustrations are for the purpose of describing embodiments of the disclosure and are not intended to limit the disclosure or any inventions thereto. As best seen in FIG. 1, a device for loading and transporting a watercraft on a vehicle generally includes a load shifting lever 12 pivotable about an elongated extension brace 14.

Figure 2A:
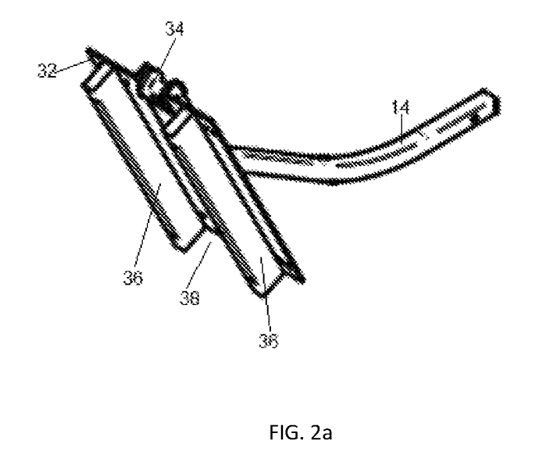
FIG. 2a is a bottom perspective view of the embodiment introduced in FIG. 1.
Figure 2B:
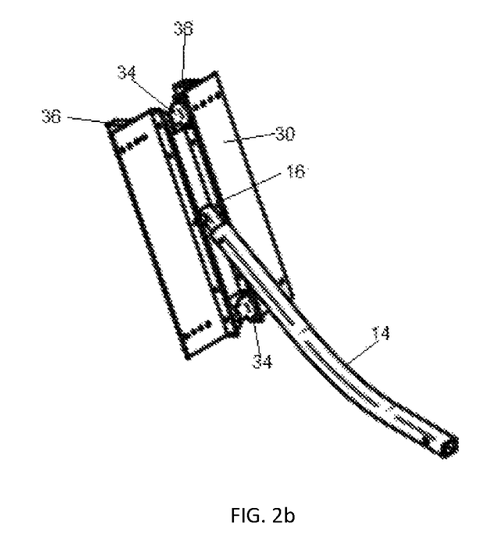
Figure 3:
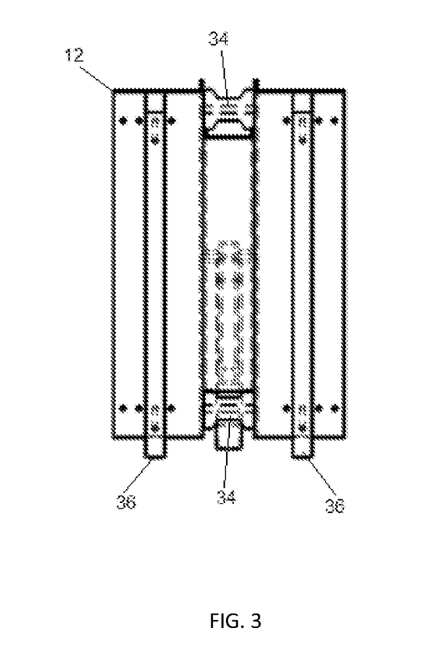
FIG. 3 is a top view of the embodiment introduced in FIG. 1.

As illustrated in FIGS. 1-3, the elongated extension brace 14 includes a first end 20 attachable to a vehicle as later shown and described herein, for instance at fastener aperture 29, and a substantially offset second end. The elongated extension brace 14 is generally a load bearing frame adapted to support at least one watercraft. The elongated extension brace 14 may include an elbow 24 offsetting the first end 20 about the opposing second end. The elongated extension brace 14 may have a plurality of adjustment apertures along its length, along with corresponding fasteners, to provide adjustable heights, for instance to accommodate different vehicle, including but not limited to truck, configurations. The opposing end of elongated extension brace 14 generally includes a pivot point 16, or the like, to allow the pivoting, rotating, and similar movement of the lever 12 shown and described herein.

As shown, lever 12 may include a rear face 30 and a receiving face 32. The receiving face 32 may include a poly slide surface to reduce bow friction, or the like, during any of the movement between positions shown and described herein. The lever 12 may include a roller 34. In particular examples, the lever 12 comprises a bow roller 34 aligned along a distal end of the lever 12. Further, the lever 12 comprises a second bow roller 34 aligned along a proximate end of the lever 12 opposite the first roller 34 to facilitate movement shown and described herein.

Figure 4A:
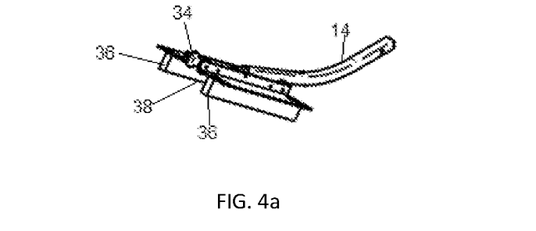
FIG. 4a is a side perspective view of the embodiment introduced in FIG. 1 in a preloading position.
Figure 4B:
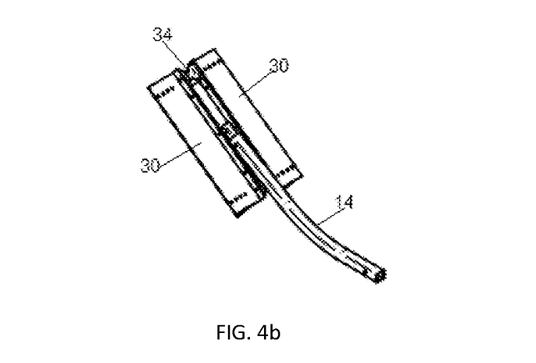
FIG. 4b is a top perspective view of the embodiment introduced in FIG. 1 in a preloading position.
Figure 4C:
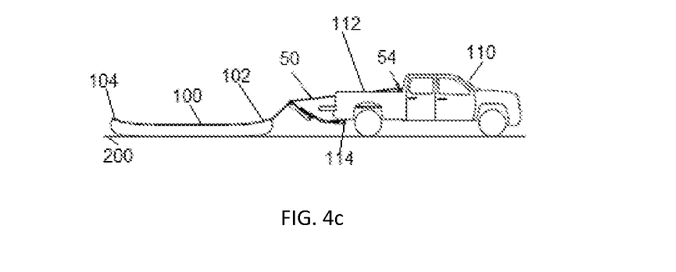
FIG. 4c is a side perspective view of the embodiment introduced in FIG. 1 in a preloading assembly position.

FIGS. 4a-4c illustrate one embodiment of the assembly in a preloading position, i.e. in a generally ramped down position ready to receive watercraft 100 from a surface 200. The vehicle may include a winch 52 to reposition tether 50, or the like, between the vehicle 110 and the bow 102 of the watercraft. As shown, the elongated extension brace 14 may be secured to hitch 114 to provide any of the angles and positioning shown and described herein.

Figure 5A:
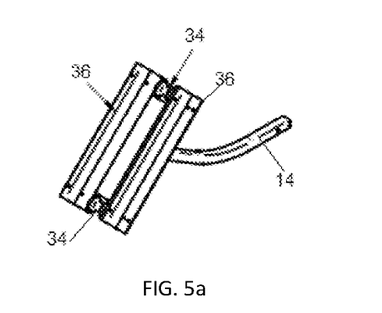
FIG. 5a is a rear perspective view of the embodiment introduced in FIG. 1 in a load shifting position.
Figure 5B:
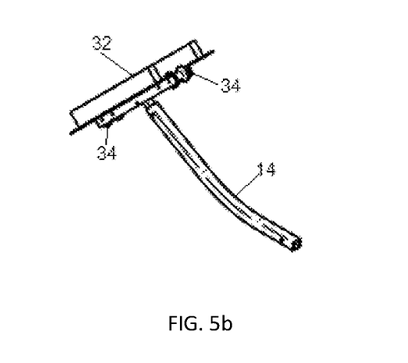
FIG. 5b is a side perspective view of the embodiment introduced in FIG. 1 in a load shifting position.
Figure 5C:
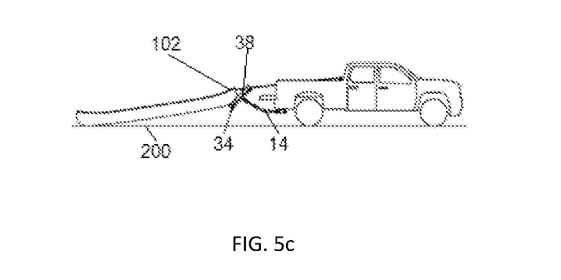
FIG. 5c is a side perspective view of the embodiment introduced in FIG. 1 in a load shifting assembly position.

FIGS. 5a-5c illustrate one embodiment of the assembly in a preloading position, i.e. in a generally ramping up position to align the watercraft 100 from surface 200 to a loading position. As shown, the lever 12 acts to lift of the bow 102 to progress beyond the rollers 34 and onto the opposing runners 36.

Figure 6A:
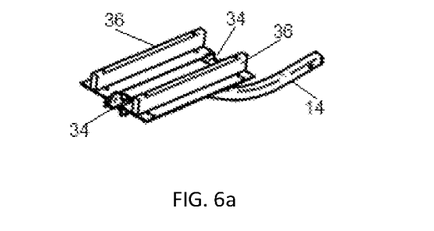
FIG. 6a is a top perspective view of the embodiment introduced in FIG. 1 in a loaded position.
Figure 6B:
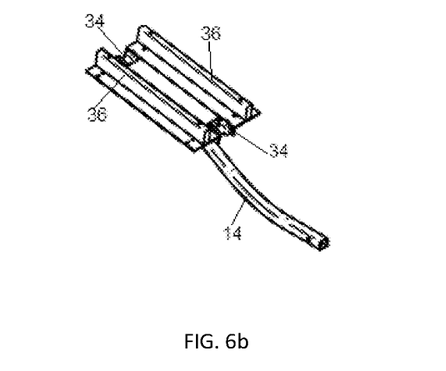
FIG. 6b is a side perspective view of the embodiment introduced in FIG. 1 in a loaded position.
Figure 6C:
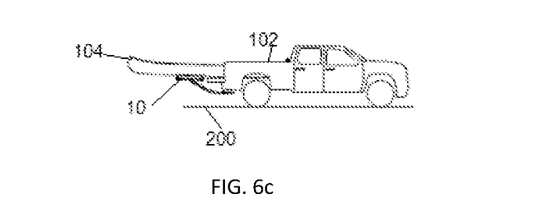
FIG. 6c is a side perspective view of the embodiment introduced in FIG. 1 in a loaded assembly position.

FIGS. 6a-6c illustrate one embodiment of the assembly in a loaded position, i.e. in a generally parallel up position to align the watercraft 100 in vehicle bed 102 in a loaded position, substantially parallel with the surface 200. Those skilled in the art having the benefit of this disclosure will recognize additional preloading, loading, and loaded positions.

Figure 7:
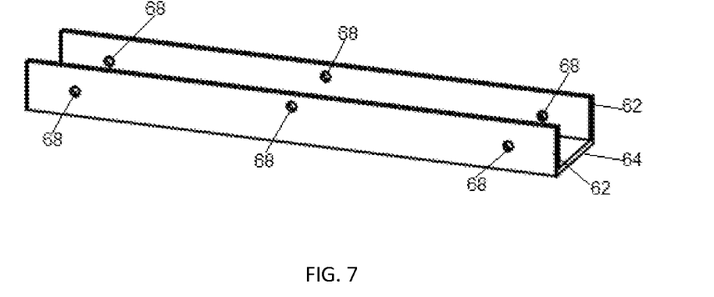
FIG. 7 is a side perspective view of an isolated channel element of the embodiment introduced in FIG. 1, with elements removed for clarity.
Figure 8:
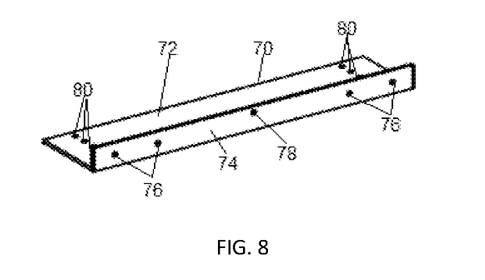
FIG. 8 is a side perspective view of an isolated wing element of the embodiment introduced in FIG. 1, with elements removed for clarity.

FIGS. 7 and 8 show channel supporting elements of the embodiment introduced in FIGS. 1 and 1a, with perpendicular wing surfaces 70 and 74, and 66 and 64, with corresponding alignment apertures 76 and 68.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

I claim:

1. A device for loading and transporting a watercraft on a vehicle, said device comprising: an elongated extension brace having a first end fitting adapted to mate with a trailer hitch of said vehicle and a substantially offset second end; and a load shifting lever having a roller and pivotable about a pivot point on said elongated extension's second end, and wherein said lever comprises a receiving slide face spaced between a pair of opposing runners adapted to align said watercraft, and wherein said lever adapted to pivot substantially one hundred and eighty degrees while engaged with said watercraft to a second loaded position.

2. The device of claim 1, wherein said roller comprises a bow roller aligned along a distal end of said lever.

3. The device of claim 1, wherein said elongated extension brace includes a plurality of adjustment apertures and an elbow offsetting said first end about said second end.

4. The device of claim 1, wherein said elongated extension brace comprises a load bearing frame adapted to support at least one watercraft.

5. The device of claim 1, wherein said receiving slide face includes a poly slide surface adapted to reduce a watercraft bow friction.

6. The device of claim 1, wherein said pair of opposing runners having elongated walls define a cavity sized to receive a corresponding watercraft hull.

7. The device of claim 6, wherein said elongated walls are repositionable about fasteners to define a plurality of semi-fixed width cavities.

8. The device of claim 1, including a rear face pivotable to a substantially parallel position about said elongated extension brace.

9. An assembly for loading and unloading a watercraft, said assembly comprising a load shifting lever pivotable about an elongated extension protruding from a vehicle, wherein said lever adapted to align substantially parallel with said elongated extension and receive said watercraft in a first loading position, and wherein said lever adapted to pivot substantially one hundred and eighty degrees while supporting said watercraft to a second loaded position, and wherein a first end of said elongated extension includes a fitting adapted to mate with a trailer hitch.

10. The assembly of claim 9, wherein a rear face of said lever positioned adjacent said elongated extension in said loading position.

11. The assembly of claim 9, wherein said lever includes a pair of opposing runners.

12. The assembly of claim 9, wherein said load shifting lever includes a roller rotatably mounted about said lever.

13. The assembly of claim 9, wherein said roller comprises a bow roller aligned along a proximate end of said lever and a corresponding bow roller aligned along a distal end of said lever.

14. The assembly of claim 13, wherein said roller comprises a pair or rollers aligned at separate locations along said lever.

15. The assembly of claim 9, wherein said elongated extension includes an offset alignment and an elbow offsetting a first end about a second end.

16. The assembly of claim 9, wherein said elongated extension comprises a load bearing frame adapted to support at least one watercraft.

17. An assembly for loading and transporting a watercraft on a vehicle having a trailer hitch, said assembly comprising: an elongated extension brace having a first end attachable to said trailer hitch, an elbow, and a substantially offset second end; a lever pivotable about said elongated extension's second end and having a receiving slide face spaced between a pair of opposing runners; and a tether aligned about said lever and repositionable between said vehicle and said watercraft, and wherein said lever aligned substantially parallel to said elongated extension brace in a loading position and at a substantially acute angle with a surface in a loading position, and wherein said lever adapted to pivot substantially one hundred and eighty degrees while engaged with said watercraft to a loaded position.

18. The assembly of claim 17, wherein said roller comprises a pair or rollers aligned at separate locations along said lever.

* * * * *